United States Patent
Mizutani et al.

(10) Patent No.: US 7,070,288 B2
(45) Date of Patent: Jul. 4, 2006

(54) VEHICLE MIRROR DEVICE, METHOD FOR MANUFACTURING MIRROR DEVICE FOR VEHICLE, AND VEHICLE

(75) Inventors: Toshinobu Mizutani, Aichi (JP); Masakazu Iwatsuki, Aichi (JP); Masakazu Aoki, Aichi (JP); Masaaki Itou, Aichi (JP); Yasunobu Okatsu, Aichi (JP)

(73) Assignee: Kabushiki Kaisha Tokai-Rik-A-Denki-Seisakusho, Aichi (JP)

( * ) Notice: Subject to any disclaimer, the term of this patent is extended or adjusted under 35 U.S.C. 154(b) by 0 days.

(21) Appl. No.: 10/508,419

(22) PCT Filed: Mar. 19, 2003

(86) PCT No.: PCT/JP03/03310

§ 371 (c)(1),
(2), (4) Date: Sep. 21, 2004

(87) PCT Pub. No.: WO03/089272

PCT Pub. Date: Oct. 30, 2003

(65) Prior Publication Data

US 2005/0141114 A1      Jun. 30, 2005

(30) Foreign Application Priority Data

Mar. 22, 2002  (JP) .............................. 2002-080036

(51) Int. Cl.
*G02B 7/182*  (2006.01)
*B60R 1/06*  (2006.01)

(52) U.S. Cl. ........................ 359/841; 359/872; 359/509

(58) Field of Classification Search ................ 359/507, 359/509, 841, 871, 872
See application file for complete search history.

(56) References Cited

U.S. PATENT DOCUMENTS 3,598,469 A * 8/1971 Landen ........................ 359/509
5,179,470 A * 1/1993 Olson .......................... 359/509

(Continued)

FOREIGN PATENT DOCUMENTS

JP         05-229459      *  9/1993

(Continued)

*Primary Examiner*—Ricky D. Shafer
(74) *Attorney, Agent, or Firm*—Thomas W. Cole; Nixon Peabody LLP (57) ABSTRACT

In a vehicle door mirror device (10), an outer side surface (20B), with respect to a vehicle, of a projection (20) of a door mirror stay (16) is made to be flat. Further, an angle of the outer side surface (20B) with respect to a front-rear direction of the vehicle, inward or outward with respect to the vehicle, is not more than 2 degrees. Therefore, wind arriving at the outer side surface (20B) flows rearward with respect to the vehicle with fluctuation thereof being suppressed, and its flow is straightened. Furthermore, a radius of curvature of a corner portion (20E) at an outer rear side, with respect to the vehicle, of the projection (20) is not more than 15 mm. Therefore, wind arriving at the outer side surface (20B) of the projection (20) is suppressed from flowing along the corner portion (20E), and its flow is straightened. Thus, wind noise performance of the door mirror stay (16) can be improved. In addition, wind drawn in by the door mirror stay (16) toward a mirror and toward a side window can be reduced, and impairment of visibility can be suppressed.

16 Claims, 7 Drawing Sheets

U.S. PATENT DOCUMENTS

| | | | |
|---|---|---|---|
| 6,017,126 A * | 1/2000 | Matsuura et al. | 359/872 |
| 6,089,723 A | 7/2000 | Ogasawara et al. | |
| 6,206,529 B1 * | 3/2001 | Kato | 359/871 |
| 6,419,300 B1 * | 7/2002 | Pavao et al. | 296/180.1 |
| 6,481,863 B1 * | 11/2002 | Horio et al. | 359/872 |
| 6,595,576 B1 * | 7/2003 | Mizutani et al. | 296/152 |
| 6,702,448 B1 * | 3/2004 | Tanaka | 359/838 |
| 6,712,413 B1 * | 3/2004 | Flowerday | 296/1.11 |

FOREIGN PATENT DOCUMENTS

| | | | |
|---|---|---|---|
| JP | 06-206498 | | 7/1994 |
| JP | 08-310302 | * | 11/1996 |
| JP | 09-52556 | | 2/1997 |
| JP | 2000-177487 | * | 6/2000 |
| JP | 2000-177488 | * | 6/2000 |
| JP | 2000-318522 | | 11/2000 |

* cited by examiner

| SECTION | CONVENTIONAL FOREIGN MATTER ADHESION RATIO P (%) | PRESENT CASE FOREIGN MATTER ADHESION RATIO Q (%) | FOREIGN MATTER ADHESION REDUCTION AMOUNT R (%) |
|---|---|---|---|
| A | 5.2 | 2.4 | 2.8 |
| B | 19.2 | 3.1 | 16.1 |
| C | 24.3 | 7.6 | 16.7 |
| D | 7.6 | 2.5 | 5.1 |
| E | 39.8 | 7.0 | 32.8 |
| F | 82.7 | 10.8 | 71.9 |
| G | 5.9 | 1.6 | 4.3 |
| H | 28.9 | 2.4 | 26.5 |
| I | 76.8 | 9.5 | 67.3 |

FIG.7 PRIOR ART ary of a corner portion of the projection, which corner portion is at the side in the projecting direction of the projection and at a rear side with respect to the vehicle, is not more than 15 mm.

VEHICLE MIRROR DEVICE, METHOD FOR MANUFACTURING MIRROR DEVICE FOR VEHICLE, AND VEHICLE

TECHNICAL FIELD

The present invention relates to a vehicle mirror device including a mirror for providing rearward view with respect to a vehicle, a method for producing the vehicle mirror device, and a vehicle provided with the vehicle mirror device.

BACKGROUND ART

Figure 7:
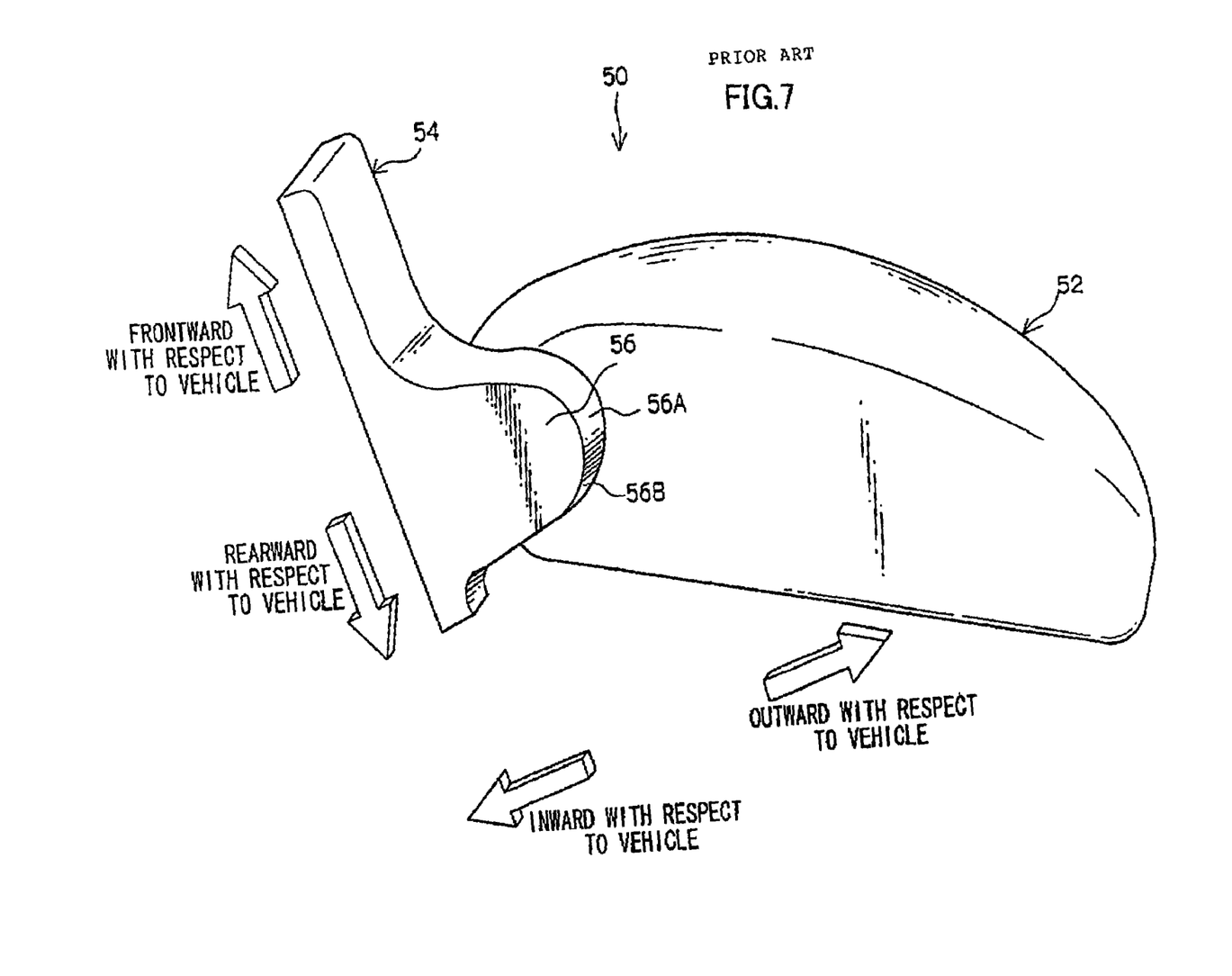
FIG. 7 is a perspective view illustrating a conventional vehicle door mirror device, viewed from a bottom side with respect to a vehicle.

As shown in FIG. 7, for example, a vehicle door mirror device 50 includes a door mirror visor 52. The door mirror visor 52 holds a mirror for providing rearward view (not shown). The door mirror visor 52 is supported by a door mirror stay 54. The door mirror stay 54 is attached to a door (not shown) of a vehicle. A projection 56 is formed at the door mirror stay 54. The projection 56 projects outward with respect to the vehicle.

In this type of vehicle door mirror device 50, however, the projection 56 is formed in a substantially semielliptic mount shape. Therefore, an outer surface 56A, with respect to the vehicle, of the projection 56 is a curved surface. This causes wind arriving at the outer surface 56A to flow rearward with respect to the vehicle with significant fluctuation, and this tends to cause turbulence.

Moreover, a radius of curvature of a corner portion 56B at an outer rear side, with respect to the vehicle, of the projection 56 is 25 mm or more. Therefore, wind arriving at the outer surface 56A of the projection 56 flows along the corner portion 56B, and this tends to cause turbulence.

Therefore, the door mirror stay 54 (the projection 56) has a problem of poor wind noise performance (performance in wind noise reduction).

Further, wind arriving at the door mirror stay 54 (the projection 56) tends to be drawn in toward the door mirror visor 52 (the mirror) and a side window (not shown) of the vehicle. This causes chattering (vibration) of the mirror and adhesion of foreign matter (for example, dust and liquid such as droplets of water) to the mirror and the side window. This, in turn, causes a problem of poor visibility.

DISCLOSURE OF INVENTION

In view of the aforementioned facts, objects of the present invention are to provide a vehicle mirror device wherein wind noise performance of a supporting member can be improved and wind drawn in by the supporting member can be reduced, as well as to provide a method for producing the vehicle mirror device, and to provide a vehicle.

A vehicle mirror device of a first aspect of the invention comprises: a holding member for holding a mirror for providing rearward view with respect to a vehicle; a supporting member disposed at a vehicle body side for supporting the holding member; and a projection disposed at the supporting member and projecting inward or outward with respect to the vehicle, wherein a projecting end surface of the projection is substantially flat, an angle of the projecting end surface of the projection with respect to a front-rear direction of the vehicle, inward or outward with respect to the vehicle, is not more than 2 degrees, a radius of curvature of a corner portion of the projection, which corner portion is at a side in a projecting direction of the projection and at a front side with respect to the vehicle, is not less than 20 mm, A vehicle mirror device of a second aspect of the invention comprises: a holding member for holding a mirror for providing rearward view with respect to a vehicle; a supporting member disposed at a vehicle body side for supporting the holding member; and a projection disposed at the supporting member and projecting inward or outward with respect to the vehicle, wherein a radius of curvature of a corner portion of the projection, which corner portion is at a side in a projecting direction of the projection and at a rear side with respect to the vehicle, is not more than 15 mm, and a radius of curvature of a corner portion of the projection, which corner portion is at the side in the projecting direction of the projection and at a front side with respect to the vehicle, is not less than 20 mm.

In the vehicle mirror device of the first and the second aspects, the holding member for holding the mirror for providing rearward view with respect to the vehicle is supported by the supporting member disposed at the vehicle body side. The projection disposed at the supporting member projects inward or outward with respect to the vehicle.

In the vehicle mirror device of the first aspect, the projecting end surface of the projection is substantially flat. Further, the angle of the projecting end surface of the projection with respect to the front-rear direction of the vehicle, inward or outward with respect to the vehicle, is not more than 2 degrees. Therefore, wind arriving at the projecting end surface of the projection flows rearward with respect to the vehicle with fluctuation thereof being suppressed, and its flow is straightened. Thus, wind noise performance (performance in wind noise reduction) of the supporting member (the projection) can be improved. In addition, wind drawn in by the supporting member (the projection) can be reduced.

In the vehicle mirror device of the first and the second aspects, the radius of curvature of the corner portion of the projection, which corner portion is at the side in the projecting direction of the projection and at the rear side with respect to the vehicle, is not more than 15 mm. Therefore, wind arriving at a projecting end surface of the projection is suppressed from flowing along the corner portion, and its flow is straightened. Thus, wind noise performance (performance in wind noise reduction) of the supporting member (the projection) can be improved. In addition, wind drawn in by the supporting member (the projection) can be reduced.

In the vehicle mirror device of the first and the second aspects, the radius of curvature of the corner portion of the projection, which corner portion is at the side in the projecting direction of the projection and at the front side with respect to the vehicle, is not less than 20 mm. Therefore, wind arriving at a front side surface, with respect to the vehicle, of the projection smoothly flows toward the projecting end surface of the projection and its flow is straightened. Thus, the wind noise performance of the supporting member (the projection) can be even more improved. In addition, the wind drawn in by the supporting member (the projection) can be even more reduced.

A vehicle mirror device of a third aspect of the invention is characterized in that, in the vehicle mirror device of the first or the second aspect, the radius of curvature of the corner portion of the projection, which corner portion is at the side in the projecting direction of the projection and at the rear side with respect to the vehicle, is not more than 10 mm.

In the vehicle mirror device of the third aspect, the radius of curvature of the corner portion of the projection, which corner portion is at the side in the projecting direction of the projection and at the rear side with respect to the vehicle, is not more than 10 mm. Therefore, the wind arriving at the projecting end surface of the projection is effectively suppressed from flowing along the corner portion, and its flow is effectively straightened. Thus, the wind noise performance (performance in wind noise reduction) of the supporting member (the projection) can be effectively improved. In addition, the wind drawn in by the supporting member (the projection) can be effectively reduced.

A method for producing a vehicle mirror device of the invention is to produce a vehicle minor device including: a holding member for holding a mirror for providing rearward view with respect to a vehicle; a supporting member disposed at a vehicle body side for supporting the holding member; and a projection disposed at the supporting member and projecting inward or outward with respect to the vehicle, wherein a projecting end surface of the projection is made to be substantially flat, an angle of the projecting end surface of the projection with respect to a front-rear direction of the vehicle, inward or outward with respect to the vehicle, is made to be not more than 2 degrees, a radius of curvature of a corner portion of the projection, which corner portion is at a side in a projecting direction of the projection and at a front side with respect to the vehicle, is made to be not less than 20 mm, and a radius of curvature of a corner portion of the projection, which corner portion is at the side in the projecting direction of the projection and at a rear side with respect to the vehicle, is made to be not more than 15 mm.

A vehicle of a first aspect of the invention is provided with the vehicle mirror device of the first or the third aspect.

A vehicle of a second aspect of the invention is provided with the vehicle mirror device of the second or the third aspect.

BEST MODE FOR CARRYING OUT THE INVENTION

Figure 1:
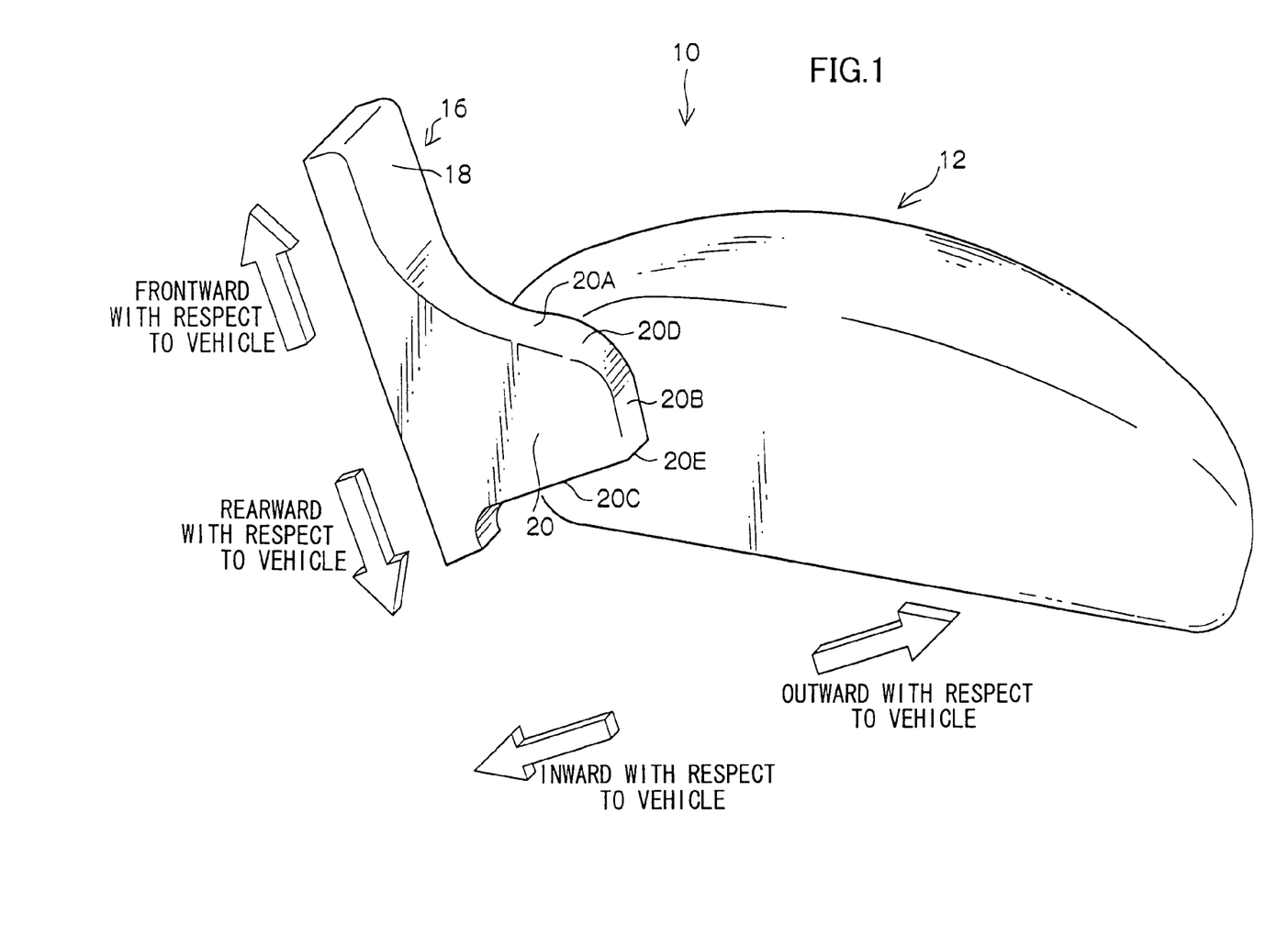
FIG. 1 is a perspective view illustrating a vehicle door mirror device according to an embodiment of the present invention, viewed from a bottom side with respect to a vehicle.
Figure 2A:
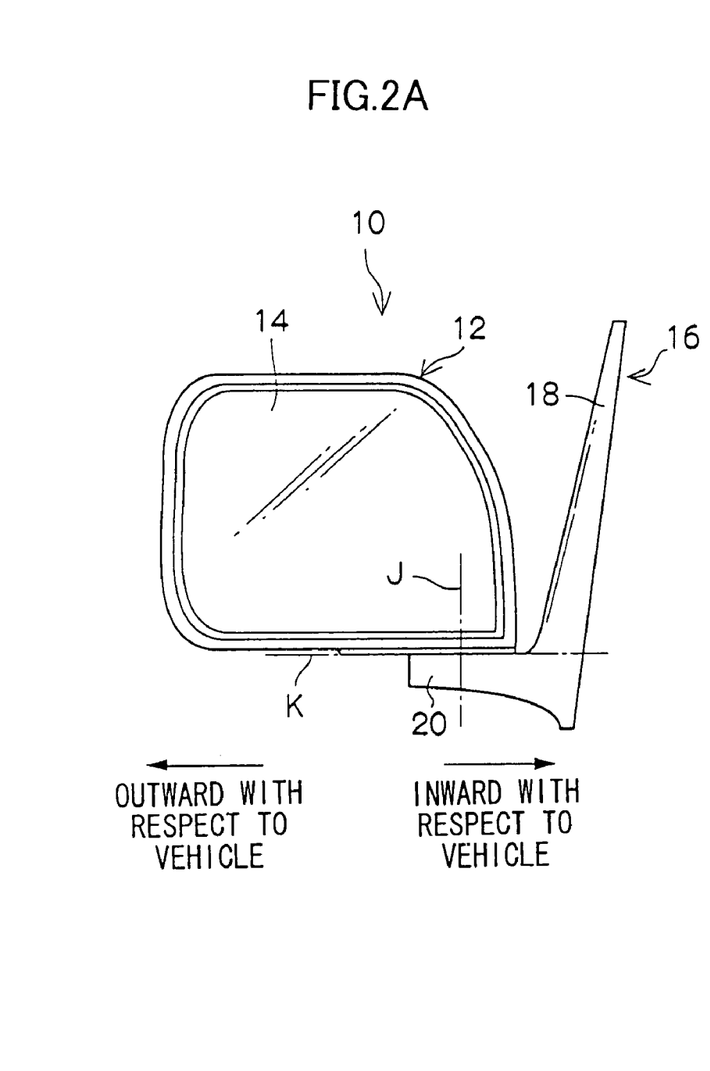
FIG. 2A is a front view illustrating an example of the vehicle door mirror device according to the embodiment of the present invention, viewed from a rear side with respect to the vehicle.
Figure 2B:
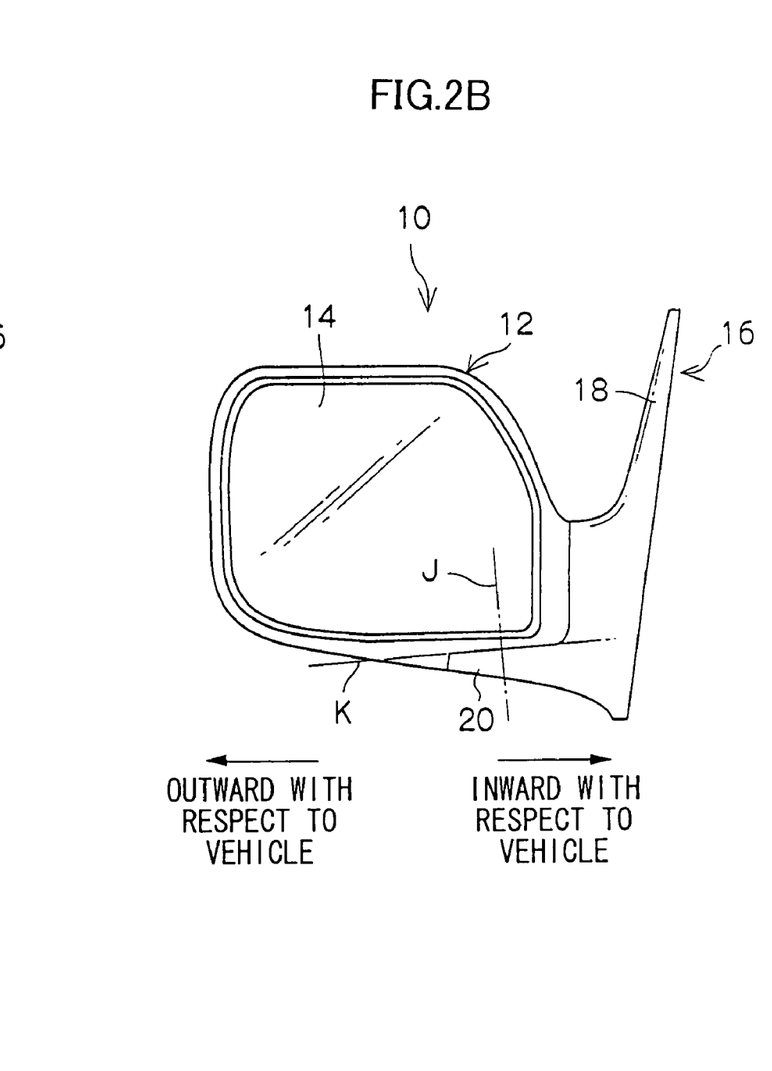
FIG. 2B is a front view illustrating another example of the vehicle door mirror device according to the embodiment of the present invention, viewed from the rear side with respect to the vehicle.

FIG. 1 shows a vehicle door mirror device 10 provided according to an embodiment to which a vehicle mirror device of the present invention is applied, in a perspective view viewed from a bottom side with respect to a vehicle. FIGS. 2A and 2B show the vehicle door mirror device 10 respectively in a front view viewed from a rear side with respect to the vehicle.

In the embodiment, "front side (or frontward) with respect to the vehicle" is referred to as "front side (or frontward)", "rear side (or rearward) with respect to the vehicle" is referred to as "rear side (or rearward)", "outer side (or outward) with respect to the vehicle" is referred to as "outer side (or outward)", and "inner side (or inward) with respect to the vehicle" is referred to as "inner side (or inward)".

The vehicle door mirror device 10 according to the embodiment includes a door mirror visor 12 that serves as a holding member. The door mirror visor 12 has a substantially rectangular box shape. A rear side surface of the door mirror visor 12 is open.

A plate-like frame (not shown) is fixed inside the door mirror visor 12. At an outer side portion of the frame, a mirror angle adjusting mechanism (not shown) is fixed at a rear side surface thereof. A mirror 14 for providing rearward view is assembled to a rear side portion of the mirror angle adjusting mechanism. The mirror 14 is held by the door mirror visor 12 via the mirror angle adjusting mechanism and the frame. The mirror 14 is disposed at the rear side surface of the door mirror visor 12. A front side of the mirror 14 is covered by the door mirror visor 12. A mirror angle of the mirror 14 is adjusted by driving the mirror angle adjusting mechanism. A retracting mechanism (not shown) is fixed at an inner side portion of the frame.

The vehicle door mirror device 10 includes a door mirror stay 16 that serves as a supporting member. The door mirror stay 16 has a plate-like stay body 18. At the stay body 18, the door mirror stay 16 is attached to a vehicle door (not shown) at a vehicle body side.

A substantially trapezoidal mount shaped projection 20 is formed at the door mirror stay 16. The projection 20 projects outward from the stay body 18. A cylindrical supporting shaft (not shown) is provided at an upper surface of the projection 20. The supporting shaft rotatably supports the retracting mechanism. Thus, the door mirror stay 16 supports the door mirror visor 12 via the retracting mechanism and the frame. When the retracting mechanism is driven, the retracting mechanism is rotated around the supporting shaft, and the mirror 14 is retracted or advanced via the frame and the mirror angle adjusting mechanism. Further, in this embodiment, all portions of the mirror 14 are disposed above a rotational reference surface K, which is perpendicular to an axial center line J of the supporting shaft and contains a point where the axial center line J of the supporting shaft intersects the upper surface of the projection 20.

Figure 3:
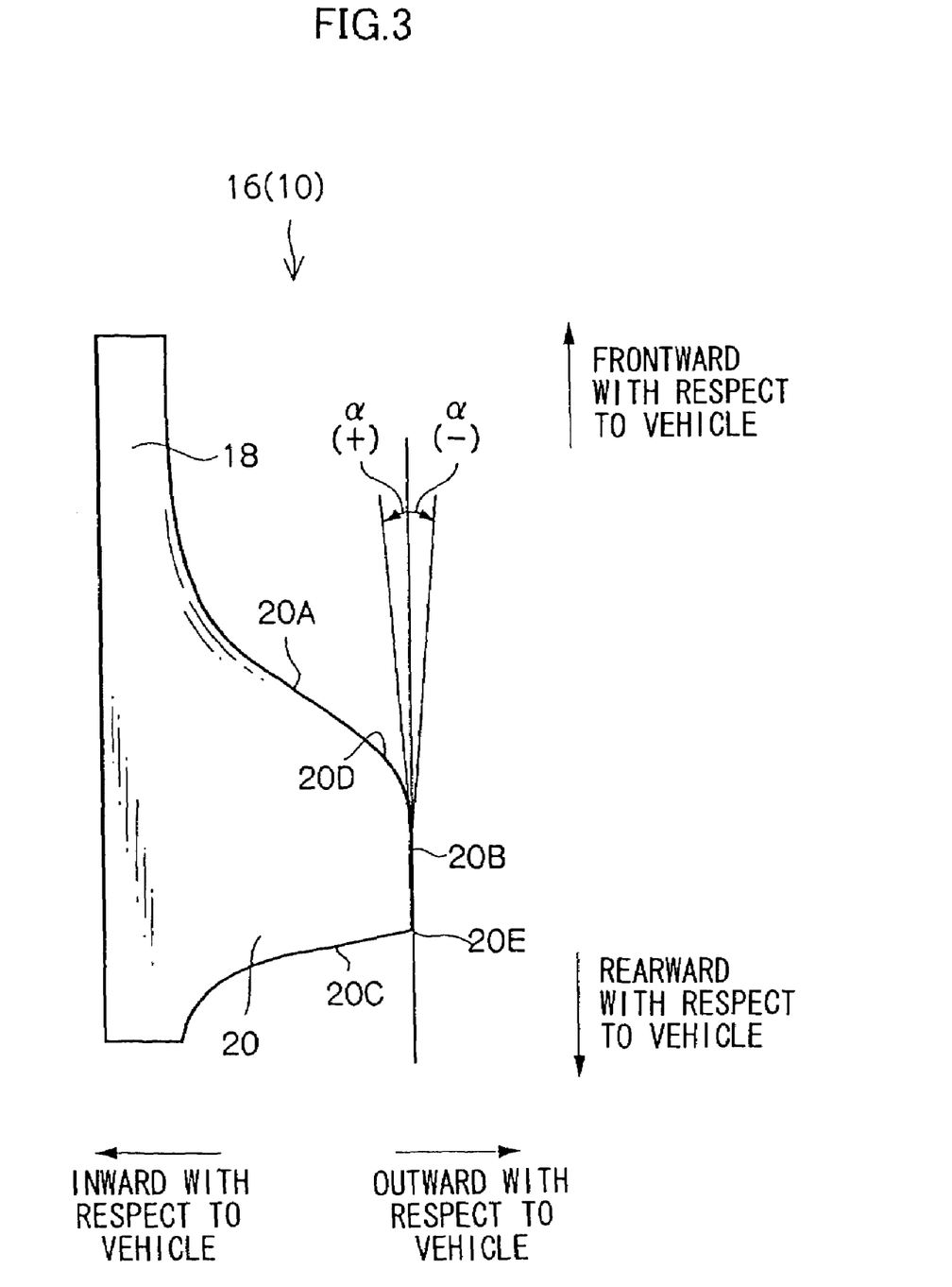
FIG. 3 is a bottom view illustrating a door mirror stay of the vehicle door mirror device according to the embodiment of the present invention.

As is shown in detail in FIG. 3, a front side surface 20A of the projection 20 is inclined in an outward and rearward direction. An angle of the front side surface 20A with respect to a rearward direction is about 45 degrees. A connecting portion between the front side surface 20A and the stay body 18 has a smoothly depressed curved surface.

An outer side surface 20B, which is a projecting end surface of the projection 20, is flat. An angle of the outer side surface 20B inward or outward with respect to a front-rear direction is not more than 2 degrees (for example, 0 degrees).

A rear side surface 20C of the projection 20 is substantially parallel to an inward-outward direction (a width direction of the vehicle). A connecting portion between the rear side surface 20C and the stay body 18 has a smoothly depressed curved surface.

A corner portion 20D, which is at an outer (projecting direction) front side of the projection 20, has a curved surface. A radius of curvature of the corner portion 20D is 20 mm or more.

A corner portion 20E, which is at an outer (projecting direction) rear side of the projection 20, has a curved surface (for example, a bent surface which is bent substantially perpendicularly. A radius of curvature of the corner portion 20E is not more than 15 mm (more preferably, not more than 10 mm).

Here, when the projection 20 of the door mirror stay 16 is produced, the front side surface 20A of the projection 20 is inclined in the outward and rearward direction. The angle of the front side surface 20A with respect to the rearward direction is made to be about 45 degrees. Further, the connecting portion between the front side surface 20A and the stay body 18 is made to have the smoothly depressed curved surface.

The outer side surface 20B of the projection 20 is made to be flat. Further, the angle of the outer side surface 20B inward or outward with respect to the front-rear direction is made to be not more than 2 degrees.

The rear side surface 20C of the projection 20 is made to be substantially parallel to the inward-outward direction. Further, the connecting portion between the rear side surface 20C and the stay body 18 is made to have the smoothly depressed curved surface.

The corner portion 20D, which is at the outer front side of the projection 20, is made to have the curved surface. Further, the radius of curvature of the corner portion 20D is made to be 20 mm or more.

The corner portion 20E, which is at the outer rear side of the projection 20, is made to have the curved surface. Further, the radius of curvature of the corner portion 20E is made to be not more than 15 mm (more preferably, not more than 10 mm).

Next, operation of this embodiment is described.

In the vehicle door mirror device 10 having the structure described above, the door mirror visor 12, which holds, via the frame and the mirror angle adjusting mechanism, the mirror 14 for providing rearward view, is supported, via the retracting mechanism and the frame, by the door mirror stay 16 attached to the vehicle door. The projection 20 formed at the door mirror stay 16 projects outward.

Here, the outer side surface 20B of the projection 20 is flat. Further, the angle of the outer side surface 20B inward or outward with respect to the front-rear direction is not more than 2 degrees. Therefore, wind arriving at the outer side surface 20B of the projection 20 flows rearward with fluctuation thereof being suppressed, and its flow is straightened.

Thus, wind noise performance (performance in wind noise reduction) of the door mirror stay 16 (the projection 20) can be improved.

In addition, wind drawn in by the door mirror stay 16 (the projection 20) toward the door mirror visor 12 (toward the mirror 14) and toward the side window (not shown) of the vehicle can be reduced. Therefore, chattering (vibration) of the mirror 14, and adhesion of foreign matter (for example, dust and liquid such as droplets of water) to the mirror 14 and the side window can be suppressed. Thus, impairment of visibility can be suppressed.

Further, the radius of curvature of the corner portion 20D at the outer front side of the projection 20 is 20 mm or more. Therefore, wind arriving at the front side surface 20A of the projection 20 smoothly flows toward the outer side surface 20B of the projection 20 and its flow is straightened. Thus, the wind noise performance of the door mirror stay 16 (the projection 20) can be even more improved. In addition, the wind drawn in by the door mirror stay 16 (the projection 20) toward the door mirror visor 12 and toward the side window can be even more reduced. Thus, impairment of visibility can be even more suppressed.

Furthermore, the radius of curvature of the corner portion 20E at the outer rear side of the projection 20 is not more than 15 mm. Therefore, wind arriving at the outer side surface 20B of the projection 20 is suppressed from flowing along the corner portion 20E, and its flow is straightened. Thus, the wind noise performance of the door mirror stay 16 (the projection 20) can be even more improved. In addition, the wind drawn in by the door mirror stay 16 (the projection 20) toward the door mirror visor 12 and toward the side window can be even more reduced. Thus, impairment of visibility can be even more suppressed.

Moreover, when the radius of curvature of the corner portion 20E at the outer rear side of the projection 20 is not more than 10 mm, the wind arriving at the outer side surface 20B of the projection 20 is effectively suppressed from flowing along the corner portion 20E, and its flow is effectively straightened. Thus, the wind noise performance of the door mirror stay 16 (the projection 20) can be even more effectively improved. In addition, the wind drawn in by the door mirror stay 16 (the projection 20) toward the door mirror visor 12 and toward the side window can be even more effectively reduced. Thus, impairment of visibility can be even more effectively suppressed.

In addition, although the invention is provided so as to be applied to the vehicle door mirror device 10 in this embodiment, the invention may be provided so as to be applied to a vehicle fender mirror device. Further, in such cases, the projection of the supporting member may be formed so as to project inward with respect to the vehicle.

(First Experimental Example)

Figure 4:
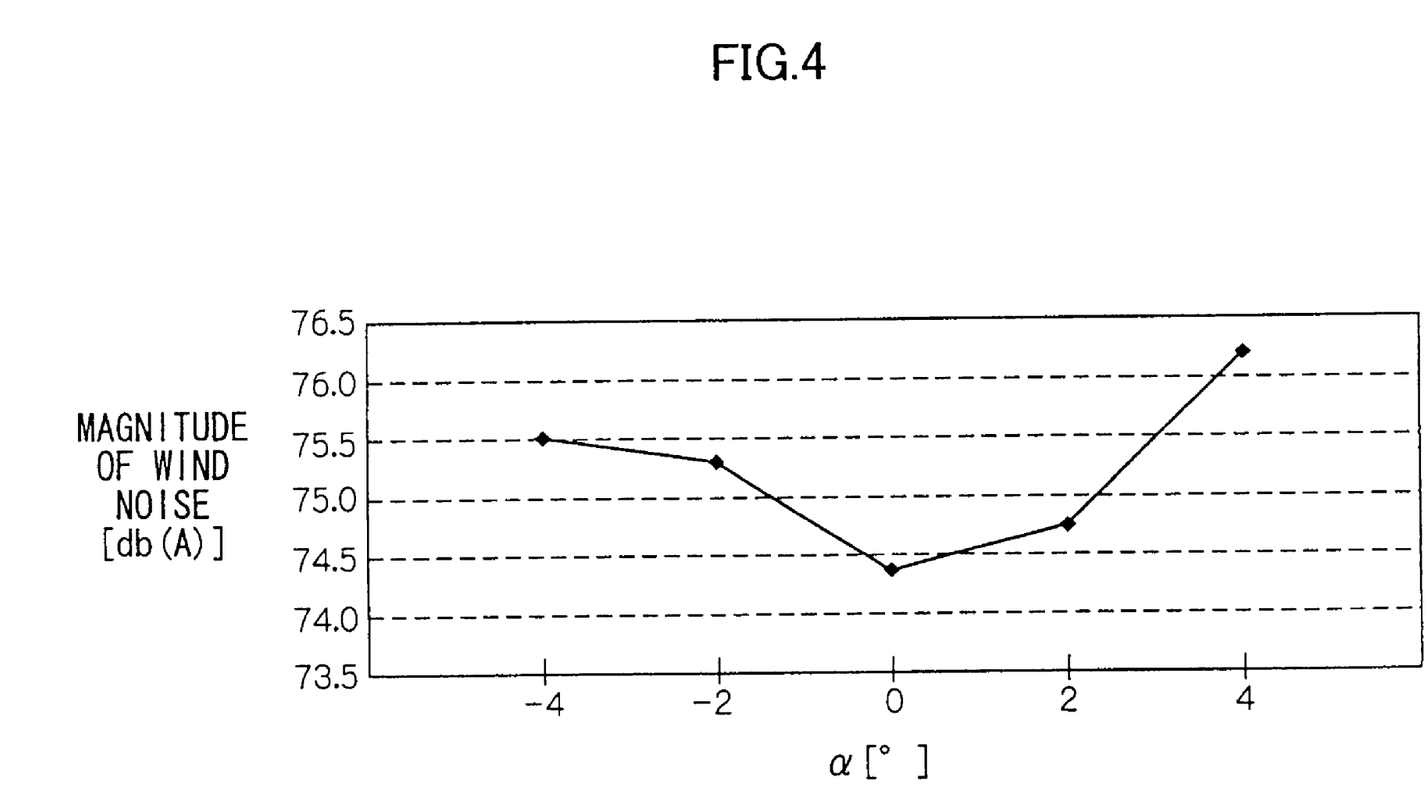
FIG. 4 is a graph illustrating results of a first experimental example.

FIG. 4 is a graph showing a relationship between the angle θ of the outer side surface 20B of the projection 20 inward or outward with respect to a front-rear direction, and a magnitude of wind noise (noise level) of the door mirror stay 16, in the vehicle door mirror device 10 according to the above described embodiment. In FIG. 4, the angle θ with "+" values represents that a rear side portion of the outer side surface 20B is inclined outward with respect to a front side portion thereof, and the angle θ with "−" values represents that the rear side portion of the outer side surface 20B is inclined inward with respect to the front side portion thereof (see FIG. 3).

Where the magnitude of wind noise is not more than 75.5 db(A), the wind noise performance of the door mirror stay 16 according to the above-described embodiment is improved when compared with the wind noise performance of the door mirror stay 54 of the conventional vehicle door mirror device 50 (see FIG. 7). In the door mirror stay 16 of the above-described embodiment, as described above, the angle θ is defined as −2 degrees ≦ θ ≦ 2 degrees. Therefore, as shown in FIG. 4, the magnitude of wind noise of the door mirror stay 16 is less than 75.5 db(A). Thus, the wind noise performance of the door mirror stay 16 can be improved.

(Second Experimental Example)

Figure 5:
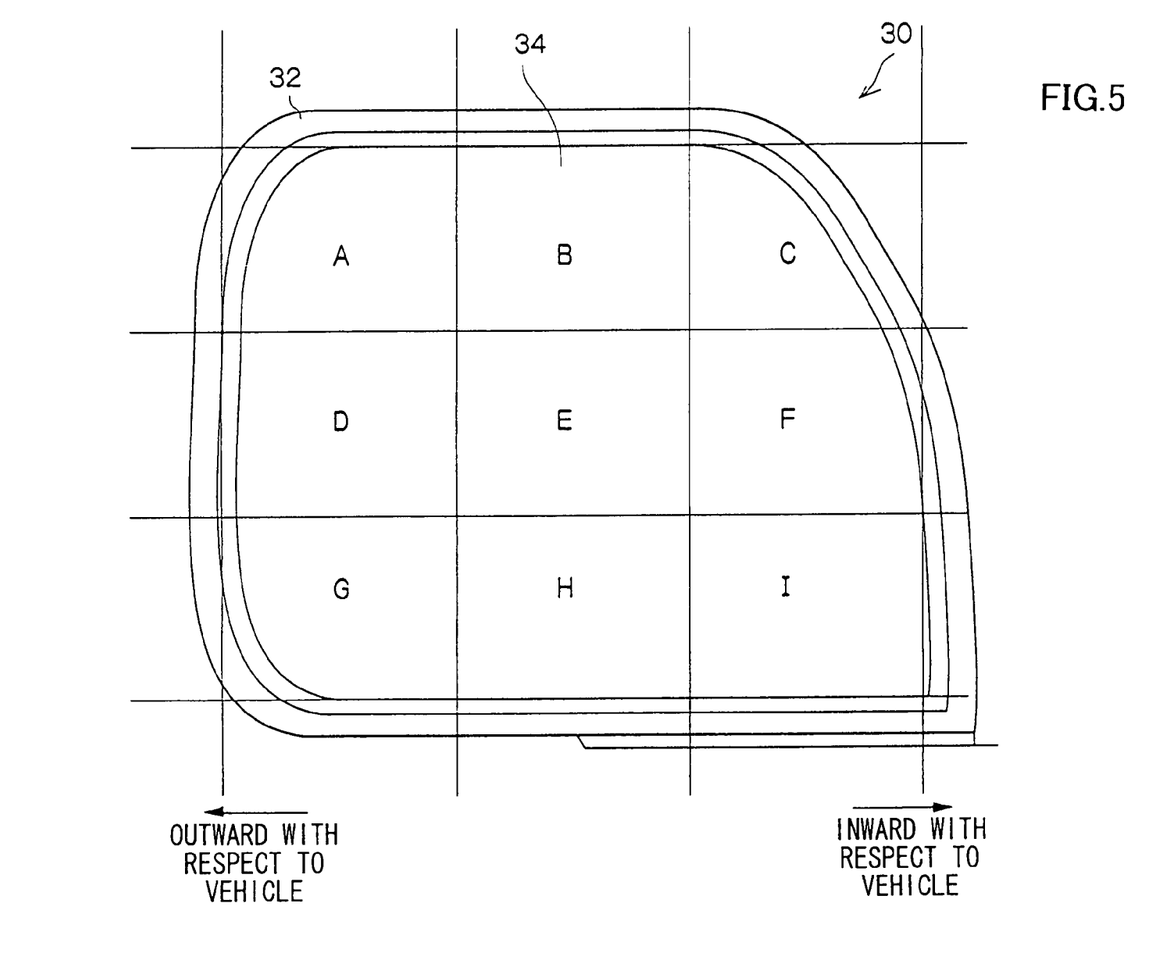
FIG. 5 is a front view illustrating a door mirror visor and a mirror of a vehicle door mirror device according to a second experimental example.

FIG. 5 is a front view of a door mirror visor 32 and a mirror 34 of a vehicle door mirror device 30 viewed from a rear side according to a second experimental example. In FIG. 5, a surface of the mirror 34 is partitioned into three sections at equal intervals in an inward-outward direction. Further, the surface of the mirror 34 is partitioned into three sections at equal intervals in an up-down direction. As a result, the surface of the mirror 34 is partitioned into nine sections (a section A, a section B, a section C, a section D, a section E, a section F, a section G, a section H and a section I).

Figure 6:
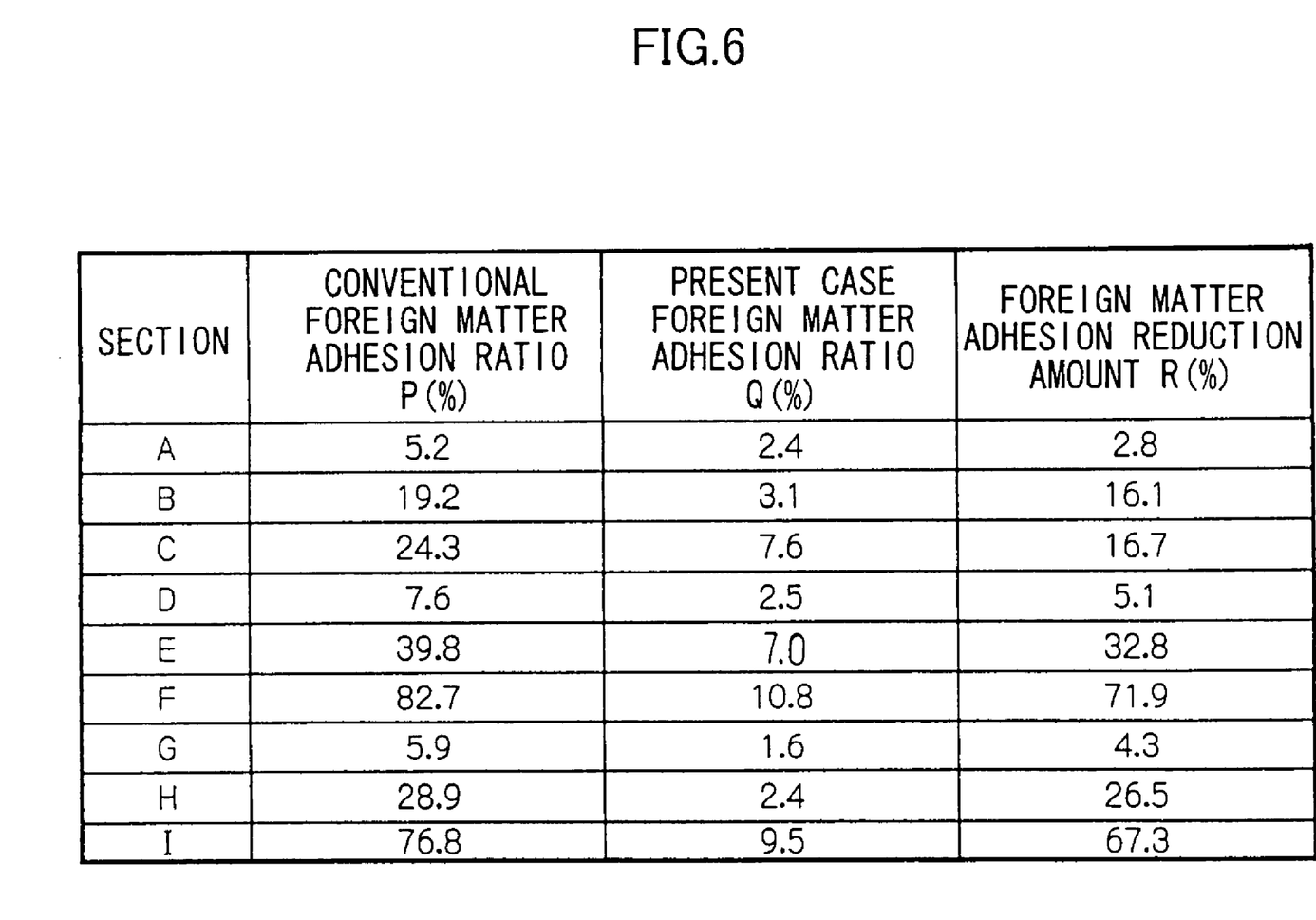
FIG. 6 is a table containing results of the second experimental example.

This experimental example serves to indicate a flow of wind using the oil-film method. FIG. 6 is a table showing a foreign matter adhesion ratio for each section of the surface of the mirror 34 shown in FIG. 5 (that is, the ratio of area in each section to which foreign matter (a liquid which does not easily run down the surface of the mirror 34) is adhered to the entire area of the section, which represents a visibility impairing ratio of the mirror 34 caused by the foreign matter for each section). FIG. 6 shows a foreign matter adhesion ratio P in a case where the vehicle door mirror device 30 of FIG. 5 is the conventional vehicle door mirror device 50, and a foreign matter adhesion ratio Q in a case where the vehicle door mirror device 30 of FIG. 5 is the vehicle door mirror device 10 of the above-described embodiment. FIG. 6 also shows a foreign matter adhesion reduction amount R for each section of the surface of the mirror 34 (that is, a value obtained by subtracting the foreign matter adhesion ratio P from the foreign matter adhesion ratio Q for each section).

As shown in FIG. 6, when compared with the foreign matter adhesion ratio P for the conventional vehicle door mirror device 50, the foreign matter adhesion ratio Q for the vehicle door mirror device 10 of the above-described embodiment is reduced in all of the sections of the surface of the mirror 34. Therefore, in the vehicle door mirror device 10 of the above-described embodiment, impairment of visibility of the mirror 34 can be suppressed in all of the sections of the mirror 34.

Further, in the section F of the surface of the mirror 34, the foreign matter adhesion reduction amount R is 71.9%, and this value is the greatest among all of the sections. In the section I of the surface of the mirror 34, the foreign matter adhesion reduction amount R is 67.3%, and this value is the second greatest among all of the sections. Therefore, in the vehicle door mirror device 10 of the above-described embodiment, impairment of visibility of the mirror 34 can be suppressed particularly effectively in the sections F and I (i.e., in a lower section and a middle section of an inner portion of the surface of the mirror 34).

INDUSTRIAL APPLICABILITY

As described above, the invention is useful for a vehicle mirror device provided with a supporting member, which supports a holding member for holding a mirror and which is provided with a projection; for a method for producing the vehicle mirror device; and for a vehicle provided with the vehicle mirror device, and is suitable for improving the wind noise performance of the supporting member and for reducing the wind drawn in by the supporting member.

What is claimed is:

1. A vehicle mirror device comprising:
    a holding member for holding a mirror for providing a rearward view with respect to a vehicle;
    a supporting member disposed at a vehicle body side for supporting the holding member; and
    a projection disposed at the supporting member and projecting inward or outward with respect to the vehicle,
    wherein substantially all of a projecting end surface of the projection is substantially flat,
    an angle of the projecting end surface of the projection with respect to a front-rear direction of the vehicle, inward or outward with respect to the vehicle, is not more than 2 degrees,
    a radius of curvature of a first corner portion of the projection, wherein said first corner portion is at a side in a projecting direction of the projection and at a front side with respect to the vehicle, is not less than 20 mm, and
    a radius of curvature of a second corner portion of the projection, wherein said second corner portion is at the side in the projecting direction of the projection and at a rear side with respect to the vehicle, is not more than 15 mm.

2. The vehicle mirror device as claimed in claim 1, wherein the radius of curvature of the second corner portion of the projection, wherein said second corner portion is at the side in the projecting direction of the projection and at the rear side with respect to the vehicle, is not more than 10 mm.

3. The vehicle mirror device as claimed in claim 1, wherein a front side surface, with respect to the vehicle, of the projection is inclined in the projecting direction of the projection and in a rearward direction with respect to the vehicle.

4. The vehicle mirror device as claimed in claim 3, wherein an angle of the front side surface of the projection with respect to the rearward direction is about 45 degrees.

5. The vehicle mirror device as claimed in claim 1, wherein a rear side surface, with respect to the vehicle, of the projection is substantially parallel to a width direction of the vehicle.

6. The vehicle mirror device as claimed in claim 1, wherein a connecting portion between a portion of the supporting member other than the projection and at least one of a front side surface and a rear side surface, with respect to the vehicle, of the projection comprises a smoothly curved surface.

7. A vehicle comprising the vehicle mirror device as claimed in claim 1.

8. The vehicle mirror device as claimed in claim 1, wherein said projecting end surface of the projection defines a free end of the supporting member that is opposite from an end of said supporting member mounted on said vehicle body.

9. The vehicle mirror device as claimed in claim 8, wherein said holding member has a bottom wall, that is mounted to a top surface of said supporting member.

10. The vehicle mirror device as claimed in claim 9, wherein said holding member is rotationally mounted onto said top surface of said supporting member.

11. A vehicle mirror device comprising:
    a holding member for holding a mirror for providing a rearward view with respect to a vehicle;

a supporting member disposed at a vehicle body side for supporting the holding member; and a projection disposed at the supporting member and projecting inward or outward with respect to the vehicle, wherein a radius of curvature of a first corner portion of the projection, wherein said first corner portion is at a side in a projecting direction of the projection and at a rear side with respect to the vehicle, is not more than 15 mm, and a radius of curvature of a second corner portion of the projection, wherein said second corner portion is at the side in the projecting direction of the projection and at a front side with respect to the vehicle, is not less than 20 mm.

12. The vehicle mirror device as claimed in claim 11, wherein the radius of curvature of the first corner portion of the projection, wherein said first corner portion is at the side in the projecting direction of the projection and at the rear side with respect to the vehicle, is not more than 10 mm.

13. The vehicle mirror device as claimed in claim 11, wherein a front side surface, with respect to the vehicle, of the projection is inclined in the projecting direction of the projection and in a rearward direction with respect to the vehicle.

14. The vehicle minor device as claimed in claim 11, wherein a rear side surface, with respect to the vehicle, of the projection is substantially parallel to a width direction of the vehicle.

15. The vehicle mirror device as claimed in claim 11, wherein a connecting portion between a portion of the supporting member other than the projection and at least one of a front side surface and a rear side surface, with respect to the vehicle, of the projection comprises a smoothly curved surface.

16. A vehicle comprising the vehicle mirror device as claimed in claim 11.

* * * * *